US008606963B2

(12) United States Patent
Bachmann et al.

(10) Patent No.: US 8,606,963 B2
(45) Date of Patent: *Dec. 10, 2013

(54) ENABLING SIMULTANEOUS USE OF HOME NETWORK AND FOREIGN NETWORK BY A MULTIHOMED MOBILE NODE

(71) Applicant: Panasonic Corporation, Osaka (JP)

(72) Inventors: Jens Bachmann, Langen (DE); Kilian Weniger, Langen (DE); Rolf Hakenberg, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,276

(22) Filed: Mar. 22, 2013

(65) Prior Publication Data

US 2013/0225163 A1   Aug. 29, 2013

Related U.S. Application Data

(60) Continuation of application No. 13/484,106, filed on May 30, 2012, now Pat. No. 8,429,294, which is a continuation of application No. 13/040,075, filed on Mar. 3, 2011, now Pat. No. 8,219,708, which is a division of application No. 12/067,110, filed as application No. PCT/EP2006/008128 on Aug. 17, 2006, now Pat. No. 8,078,753.

(30) Foreign Application Priority Data

Sep. 19, 2005   (EP) .................................... 05020354

(51) Int. Cl.
*G06F 15/16* (2006.01)
*G06F 15/173* (2006.01)
*H04J 3/24* (2006.01)
*H04L 12/28* (2006.01)

(52) U.S. Cl.
USPC ........... 709/238; 709/203; 709/231; 709/246; 370/328; 370/331; 370/338; 370/349; 370/390

(58) Field of Classification Search
None
See application file for complete search history.

(56) References Cited

U.S. PATENT DOCUMENTS 7,152,238 B1   12/2006   Leung et al.
7,299,046 B1   11/2007   Ozugur et al.
(Continued)

FOREIGN PATENT DOCUMENTS

EP   1 635 515 A2   3/2006
EP   1 432 198 B1   6/2007
(Continued)

OTHER PUBLICATIONS

Extended European Search Report, dated Mar. 10, 2010.
(Continued)

*Primary Examiner* — Ario Etienne
*Assistant Examiner* — Ho Shiu
(74) *Attorney, Agent, or Firm* — Seed IP Law Group PLLC

(57) ABSTRACT

The invention relates to a method performed by a home agent serving a mobile node in a home network upon attachment of a mobile node to the home network as well as to the home agent. The invention also relates to a method for enabling simultaneous use of a plurality of interfaces by a mobile node being attached to a home network through one of the plurality of interfaces and to at least one foreign network through at least another interface of the plurality of interfaces. Moreover, the invention provides a mobile node and a proxy acting on behalf of the mobile node. To enable a mobile node to use a home network and at least one foreign network for communications the invention suggests the registration of the mobile node's home address or of a network node's address within its home network as a care-of address in the home network.

2 Claims, 6 Drawing Sheets

(56) References Cited

U.S. PATENT DOCUMENTS

| | | |
|---|---|---|
| 7,369,522 B1 | 5/2008 | Soininen et al. |
| 7,382,748 B1 | 6/2008 | Bharatia et al. |
| 7,430,174 B2 * | 9/2008 | Janneteau et al. ............ 370/238 |
| 2002/0080767 A1 | 6/2002 | Lee |
| 2003/0016655 A1 | 1/2003 | Gwon |
| 2003/0018810 A1 | 1/2003 | Karagiannis et al. |
| 2003/0091030 A1 | 5/2003 | Yegin et al. |
| 2004/0120294 A1 | 6/2004 | Yang et al. |
| 2004/0203765 A1 | 10/2004 | Das et al. |
| 2004/0236937 A1 * | 11/2004 | Perkins et al. ................ 713/150 |
| 2004/0242233 A1 * | 12/2004 | Lutgen .......................... 455/445 |
| 2004/0264463 A1 * | 12/2004 | Fukushima et al. .......... 370/390 |
| 2005/0128975 A1 * | 6/2005 | Kobayashi et al. .......... 370/328 |
| 2005/0144303 A1 * | 6/2005 | Zhang et al. ................. 709/231 |
| 2005/0198372 A1 | 9/2005 | Narayanan et al. |
| 2005/0255847 A1 * | 11/2005 | Han et al. ..................... 455/436 |
| 2006/0018291 A1 | 1/2006 | Patel et al. |
| 2006/0018299 A1 * | 1/2006 | Yamamoto .................... 370/349 |
| 2006/0050628 A1 | 3/2006 | Ng et al. |
| 2006/0056349 A1 | 3/2006 | Nakatugawa et al. |
| 2006/0129630 A1 * | 6/2006 | Catalina-Gallego et al. . 709/203 |
| 2006/0146748 A1 | 7/2006 | Ng et al. |
| 2007/0030822 A1 | 2/2007 | Jagana et al. |
| 2009/0019180 A1 * | 1/2009 | Aso et al. ..................... 709/238 |
| 2009/0080387 A1 | 3/2009 | Dell'Uomo et al. |
| 2009/0122723 A1 | 5/2009 | Hirano et al. |

FOREIGN PATENT DOCUMENTS

| | | |
|---|---|---|
| WO | 2004/059926 A1 | 7/2004 |
| WO | 2004/111750 A2 | 12/2004 |

OTHER PUBLICATIONS

Japanese Office Action, dated Dec. 9, 2011, with translation.
Johnson, "Scalable support for transparent mobile host internetworking," Wireless networks 1, pp. 311-321, 1995.
Montavont et al., "Mobile IPv6 for multiple interfaces," IETF MIP6 Working Group Internet-Draft, Oct. 2003, p. 1-25.
Ylitalo et al., "Dynamic Network Interface Selection in Multihomed Mobile Hosts," System Sciences, Proceedings of the 36th Annual Hawaii International Conference on System Sciences, Jan. 2003, p. 1-10.
Chowdhury et al., "Network Based Layer 3 Connectivity and Mobility Management for IPv6," Network Working Group, Internet-Draft, Feb. 26, 2006, 16 pages.
3GPP TS 29.060 V7.2.0, "3rd Generation Partnership Project; Technical Specification Group Core Network and Terminals; Gneral Packet Radio Service (GPRS); GPRS Tunnelling Protocol (GTP) across the Gn and Gp interface (Release 7)," Jun. 2006, 135 pages.

* cited by examiner

```
                          +-+-+-+-+-+-+-+-+-+-+-+-+-+-+-+-+
                          |           Sequence #          |
+-+-+-+-+-+-+-+-+-+-+-+-+-+-+-+-+-+-+-+-+-+-+-+-+-+-+-+-+-+-+-+-+
|A|H|L|K|     Reserved    |            Lifetime           |
+-+-+-+-+-+-+-+-+-+-+-+-+-+-+-+-+-+-+-+-+-+-+-+-+-+-+-+-+-+-+-+-+
|                                                               |
.                                                               .
.                       Mobility options                        .
.                                                               .
|                                                               |
+-+-+-+-+-+-+-+-+-+-+-+-+-+-+-+-+-+-+-+-+-+-+-+-+-+-+-+-+-+-+-+-+
```

Fig. 5

```
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |   Type = TBD  |    Length     |
+-+-+-+-+-+-+-+-+-+-+-+-+-+-+-+-+-+-+-+-+-+-+-+-+-+-+-+-+-+-+-+-+
|     Binding Unique ID (BID)   |Priority/Status|C|R|  Reserved |
+-+-+-+-+-+-+-+-+-+-+-+-+-+-+-+-+-------------------------------+
+                                                               +
+                      Care-of Address (CoA)                    +
+                                                               +
+---------------------------------------------------------------+
```

Fig. 6

| Home Address | Care-of Address | Lifetime | Home registration flag | Sequence Number | Usage info | BID | Priority | Filter |
|---|---|---|---|---|---|---|---|---|
| HoA#1 | CoA#1 | 453 | 1 | 332 | | 1 | 1 | \<filter rules\> |
| HoA#1 | CoA#2 | 4636 | 1 | 634 | | 2 | 3 | \<filter rules\> |
| HoA#1 | HoA#1 | 3474 | 1 | 12 | | 3 | 2 | \<filter rules\> |
| HoA#2 | CoA#3 | 1241 | 1 | 63 | | 1 | 1 | \<filter rules\> |
| HoA#2 | CoA#4 | 756 | 1 | 125 | | 1 | 2 | \<filter rules\> |

Fig. 7

| IP Address | Link-Layer Address |
|---|---|
| IP#1 | LLA#1 |
| IP#2 | LLA#2 |
| IP#3 | LLA#2 |

Fig. 8

| Destination Address | Gateway | Filter | Interface |
|---|---|---|---|
| HoA#1 | CoA#1 | \<filter rules\> | tun0 |
| HoA#1 | CoA#2 | \<filter rules\> | tun1 |
| HoA#1 | HoA#1 | \<filter rules\> | eth0 |
| * | GW#1 | \<filter rules\> | eth0 |

ENABLING SIMULTANEOUS USE OF HOME NETWORK AND FOREIGN NETWORK BY A MULTIHOMED MOBILE NODE

This is a continuation of U.S. application Ser. No. 13/484,106 filed May 30, 2012, which is a continuation of U.S. application Ser. No. 13/040,075 filed Mar. 3, 2011, now U.S. Pat. No. 8,219,708, which is a divisional of U.S. application Ser. No. 12/067,110 filed Jun. 2, 2008, now U.S. Pat. No. 8,078,753, which is a national stage of PCT/EP2006/008128 filed Aug. 17, 2006, which is based on European Application No. 05020354.6 filed Sep. 19, 2005, the entire contents of each which are incorporated by reference herein.

FIELD OF THE INVENTION

The invention relates to a method performed by a home agent serving a multihomed mobile node in a home network of the multihomed mobile node upon attachment of a multihomed mobile node to the home network as well as to the home agent. Further, the invention also relates to a method for enabling simultaneous use of a plurality of interfaces by a multihomed mobile node being attached to a home network through one of the plurality of interfaces and to at least one foreign network through at least another interface of the plurality of interfaces. Moreover, the invention provides a multihomed mobile node and a proxy acting on behalf of the multihomed mobile node.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

However, knowing that user and operator requirements and expectations will continue to evolve, the 3GPP has begun considering the next major step or evolution of the 3G standard to ensure the long-term competitiveness of 3G. The 3GPP launched a Study Item "Evolved UTRA and UTRAN" (E-UTRA and E-UTRAN). The study will investigate means of achieving major leaps in performance in order to improve service provisioning and reduce user and operator costs.

It is generally assumed that there will be a convergence toward the use of Internet Protocols (IP), and all future services will be carried on top of IP. Therefore, the focus of the evolution is on enhancements to the packet-switched (PS) domain.

The main objectives of the evolution are to further improve service provisioning and reduce user and operator costs as already mentioned.

More specifically, some key performance and capability targets for the long-term evolution are:

Significantly higher data rates compared to HSDPA and HSUPA: envisioned target peak data rates of more than 100 Mbps over the downlink and 50 Mbps over the uplink;
Improved coverage: high data rates with wide-area coverage;
Significantly reduced latency in the user plane in the interest of improving the performance of higher layer protocols (for example, TCP) as well as reducing the delay associated with control plane procedures (for instance, session setup);
Greater system capacity: threefold capacity compared to current standards.

Another key requirement of the long-term evolution is to allow for a smooth migration to these technologies.

Mobility Management

For mobility management in a system with heterogeneous access networks different protocols may be applied. On the one hand global mobility protocols may be used for inter Access System mobility. A well-known example for a global mobility protocol is the client-based network layer protocol Mobile IP (MIPv6). With this protocol the mobility is transparent on a mobile node for layers above the network layer. On the other hand local mobility protocols are used for intra Access System mobility, examples thereof are NetLMM or GTP. Especially these two examples are network-based, i.e., their use is completely transparent to the mobile node, in particular the network layer. NetLMM is IP-based and independent of the underlying network technology, whereas GTP is especially for the 3GPP network and is coupled with the technology, e.g., relies on 3GPP specific identifiers.

MIPv6

Using Mobile IPv6 as specified in RFC 3775 (available at http://www.ietf.org, incorporated herein by reference) a mobile node (MN) is reachable by its home address even when away from home. For this the mobile node is associated with a care-of address (CoA), which provides information about the mobile node's current location. The home agent (HA) of the mobile node and also a correspondent node (CN) set up a binding between the home address and the care-of address in a cache and packets destined for the mobile node are directly sent to the care-of address. If the mobile node is at its home network, it deregisters the care-of address and receives packets directly with its home address.

In order to allow a home agent to intercept traffic for a node the proxy Neighbor Advertisements of the Neighbor Discovery protocol are used. According to Mobile IPv6 if there is a binding cache entry in the home agent for a mobile node, the home agent sends proxy neighbor advertisements so that the neighbor cache entries of the nodes in the vicinity of the home agent are updated and all traffic to the mobile node is sent to the link-layer address of the home agent.

In the IETF (Internet Engineering Task Force) discussions are ongoing how to enhance Mobile IPv6 to support Mobile Nodes with multiple interfaces. This simultaneous use of the multiple interfaces increases service quality for the terminals and makes better use of the network capacity.

Mobile Node Returning "Home"

When returning home, i.e., one of the mobile node's interfaces is attached to the home link, two possible approaches are described in the state of the art.

In the first approach the mobile node sends a binding update to the home agent with its home address as a care-of address, the home registration bit set and lifetime set to zero, to instruct its home agent to no longer intercept or tunnel packets for it. In this case the home agent deletes the binding of the mobile node from the binding cache and stops sending proxy neighbor advertisements in behalf of the mobile node. On the other hand the mobile node starts to send neighbor advertisements with its own link-layer address on the home link, so that the neighbor cache entries in the routers are changed and all traffic is directly sent to the mobile node.

In a second approach the mobile node de-registers the binding for the interface on the home link and stops using the interface. In this case all traffic previously sent to the deregistered interface is then sent to the remaining registered interface, i.e., through a foreign network to which the mobile node is still connected.

In both scenarios it is not possible for the MN to use the home link and a foreign link simultaneously.

SUMMARY OF THE INVENTION

The object of the invention is to enable a multihomed mobile node to use a home network and at least one further foreign network for communications.

The object is solved by the subject matter of the independent claims. Advantageous embodiments are subject to the dependent claims.

One of the aspects of the invention is to allow a multihomed mobile node to register its home address as a care-of address in its home network when being connected thereto. Alternatively, an address of a network node in the home network may be registered in the binding cache of the multihomed mobile node's home agent. Another aspect of the invention is to allow a multihomed mobile node to register plural care-of addresses at its home agent which may include the multihomed mobile node's home address or an address in the home network.

One embodiment of the invention relates to a method performed by a home agent serving a multihomed mobile node in a home network of the multihomed mobile node upon attachment of a multihomed mobile node to the home network. The home agent may receive a binding update message for registering an address in the home network as a care-of address for the multihomed mobile node. This address to be registered as a care-of address for the multihomed mobile node in the home network is a home address of the multihomed mobile node in the home network or an address of a network node located in the home network. The network node may for example be a proxy acting on behalf of the multihomed mobile node. Further, the home agent adds the address as a care-of address to its binding cache.

Adding the address to the binding cache of the home agent may for example generate a binding for the multihomed mobile node's home address in the home network. Further, the registration of the address as a care-of address for the multihomed mobile node in the home network may indicate to the home agent that the multihomed mobile node is further attached to at least one foreign network.

In a further embodiment of the invention, the binding update comprises a binding unique identifier assigned to the binding generated by registering the address as a care-of address of the multihomed mobile node in the home network.

In another embodiment of the invention the binding update may comprise a lifetime field that indicates a number of time units remaining before the binding is considered expired by the home agent. According to this embodiment the lifetime field indicates that the binding of the registered address as a care-of address for the multihomed mobile node in the home network does not expire.

In a further embodiment of the invention, the binding cache further includes at least one further care-of address for the multihomed mobile node in at least one foreign network.

Moreover, according to another embodiment of the invention, the home agent may transmit, relay or forward network layer packets to the multihomed mobile node through the home network utilizing the address registered as a care-of address for the multihomed mobile node in the home network and/or through at least one foreign network to which the multihomed mobile node is further attached utilizing a care-of address of the multihomed mobile node in the respective at least one foreign network registered for the multihomed mobile node in the binding cache.

According to yet another embodiment of the invention, the home agent may transmit or forward network layer packets to the multihomed mobile node utilizing at least one care-of address of the plurality of care-of addresses registered for the multihomed mobile node in a binding cache maintained by the home agent.

In order to transmit, relay or forward the network layer packets to the multihomed mobile node the home agent may first resolve a link layer address associated with the care-of address in the binding cache from a neighbor cache maintained in the home agent so as to transmit, relay or forward the network layer packets to said resolved link layer address, e.g., by means of a link layer protocol.

In a variation of this embodiment, when forwarding or transmitting the transport layer packets to the multihomed mobile node through the home network, the resolved link layer address may be the link layer address of the multihomed mobile node on its interface to the home network or a link layer address of an intermediate node in the downlink distribution path between home agent and the multihomed mobile node.

In a further variation of the embodiment the network layer packets are forwarded or transmitted to the multihomed mobile node using the home network specific layered protocol structure of the user plane. This may for example include sending the network data packets to the multihomed mobile node via an intermediate node in the downlink distribution path between home agent and the multihomed mobile node.

Further, in another variation of the embodiment, the home agent may receive a message indicating the intermediate node's link layer address and the home agent may update the neighbor cache thereby associating the intermediate node's link layer address with the registered care-of address associated with the address in the binding update.

In a further embodiment of the invention the home agent maintains a binding cache comprising a plurality of care-of addresses registered for the multihomed mobile node, wherein the plurality of care-of addresses includes said address comprised in the binding update. Moreover, the home agent may decide which care-of address or which care-of addresses to utilize for transmitting or forwarding network layer packets to the multihomed mobile node based on filter policies.

The filter policies may for example comprise at least one of user preferences, network operator preferences, source and destination IP addresses, transport protocol number, source and destination port numbers, flow label field in the IPv6 header, Security Parameter Index (SPI) in case of using IPv6 security (IPsec), destination prefix, type of the multihomed mobile node interface associated to a care-of address, link characteristics on the communication link associated to a care-of address.

Further, in a variation of this embodiment the home agent may receive at least a part of the filter policies from the multihomed mobile node, a proxy acting on behalf of the multihomed mobile node or a policy control node in the home network or a foreign network.

In another embodiment of the invention the home agent performs a proxy neighbor discovery on behalf of the multihomed mobile node in response to receiving the binding update. Moreover, there may be situations where the home agent has performed the proxy neighbor discovery on behalf of the multihomed mobile node prior to the multihomed mobile node attaching to the home network. The proxy neighbor discovery may for example include advertising the home agent's link layer address as the link layer address of the multihomed mobile node.

According to another embodiment of the invention, the attachment of the multihomed mobile node to the home network comprises establishing communication bearers according to the radio access technology of the home network for data exchange between the access system of the home network and the multihomed mobile node. The communication bearers may for example be established prior to receiving the binding update at the home agent.

The binding update may be received through a communication link in the home network and/or a foreign network.

In some embodiments of the invention the binding update is received from the multihomed mobile node.

In other embodiments of the invention the binding update is received from a proxy in the home network. For example, the proxy may be located in the user plane data distribution path or the control plane data path between home agent and multihomed mobile node.

In even other embodiments of the invention the binding update is received from a local mobility anchor in the home network handling mobility of the multihomed mobile node within the home network. In this embodiment, the binding update may indicate an address of the local mobility anchor for registration as a care-of address for the multihomed mobile node.

In some embodiments of the invention the home agent acts as a mobility anchor for the multihomed mobile node when moving through different networks.

Another embodiment of the invention provides a method for enabling simultaneous use of a plurality of interfaces by a multihomed mobile node being attached to a home network through one of the plurality of interfaces and to at least one foreign network through at least another interface of the plurality of interfaces. The multihomed mobile node or a proxy acting on behalf of the multihomed mobile node initiate the registration of an address in the home network to which the multihomed mobile node has attached as a care-of address for the multihomed mobile node in the home network at a home agent serving the multihomed mobile node in the home network. As mentioned above, the address to be registered as a care-of address for the multihomed mobile node in the home network is a home address of the multihomed mobile node in the home network or an address of a network node located in the home network. Further, in response to the registration of the address as a care-of address for the multihomed mobile node the multihomed mobile node or its proxy may receive network layer packets through the home network and the at least one foreign network. Hence, the network layer packets destined to the multihomed mobile node may be provided to same through its home network and/or at least one foreign network.

As already indicated before, the registration of the address may generate a binding for the multihomed mobile node's home address in the home network. The binding update may for example be sent via the home network and/or the at least one foreign network. The registration of the address in the home network as a care-of address for the multihomed mobile node may for example be initiated by sending a binding update to the home agent.

In a further embodiment of the invention, the registration of the address in the home network as a care-of address for the multihomed mobile node may be initiated by requesting a network node or the proxy in the home network to send a binding update to the home agent on behalf of the multihomed mobile node.

Moreover, according to another embodiment of the invention, the multihomed mobile node or its proxy may ignore requests for a multihomed mobile node's link layer address by other communication nodes in the home network.

In another embodiment of the invention, the multihomed mobile node or its proxy may indicate the home agent's link layer address to at least one other communication node in the home network in response to requests for the multihomed mobile node's link layer address by the at least one other network node in the home network or the proxy.

According to another embodiment of the invention the multihomed mobile node or the proxy may trigger the home agent to perform proxy neighbor discovery functions on behalf of the multihomed mobile node upon having attached to the home network. This could for example be accomplished by a binding update sent by the multihomed mobile node or the proxy to register the address in the home network as a care-of address for the multihomed mobile node in the home network.

In a further embodiment of the invention, the multihomed mobile node or its proxy transmit filter policies to the home agent. The filter policies may be used by the home agent to determine which one or a part of a plurality of care-of addresses registered for the multihomed mobile node and including the address in the home network is used to transmit or forward transport layer packets to the multihomed mobile node.

In another embodiment of the invention, the proxy and/or said network node located in the home network is located on the data distribution path between home agent and multihomed mobile node in the home network.

Further, it should be noted that the network node located in the home network may also be the same network node or functional entity as the proxy acting on behalf of the multihomed mobile node.

Generally, a foreign network or the home network is for example any of a 3GPP based network, a non-3GPP based wireless network, a WiMAX network, a Bluetooth network, a wireless packet-switched network or a fixed packet-switched network. The address, the home address and care-of addresses may for example be network layer addresses, such as IPv6 addresses. Hence, in some embodiments of the invention, the network layer is implemented by the IPv6 protocol and at least the multihomed mobile node and the home agent implement the Mobile IPv6 protocol.

Another embodiment of the invention relates to a home agent serving a multihomed mobile node in a home network of the multihomed mobile node upon attachment of a multihomed mobile node to the home network. The home agent may include a receiver for receiving a binding update for registering an address in the home network as a care-of address for the multihomed mobile node. This address to be registered as a care-of address for the multihomed mobile node in the home network may for example be a home address of the multihomed mobile node in the home network or an address of a network node being located in the home network. Further, the home agent may comprise a processing means, such as a processor, for adding the home address of the multihomed mobile node or the address of the network node located in the home network as a care-of address to a binding cache maintained by the home agent.

In another embodiment of the invention the home agent is configured to perform the steps of the method performed by the home agent according to one of the various embodiments and variations thereof described herein.

Further, another embodiment of the invention relates to a multihomed mobile node for enabling simultaneous use of a plurality of interfaces by a multihomed mobile node being attached to a home network through one of the plurality of interfaces and to at least one foreign network through at least another interface of the plurality of interfaces. The multihomed mobile node may comprise a processing means for initiating the registration of an address in the home network to which the multihomed mobile node has attached as a care-of address for the multihomed mobile node in the home network at a home agent serving the multihomed mobile node in the home network. This address to be registered as a care-of address for the multihomed mobile node in the home network may for example be a home address of the multihomed mobile node in the home network or an address of a network node being located in the home network. Further, the multihomed mobile node may have a receiver for receiving network layer packets through the home network and the at least one foreign network in response to the registration of the address as a care-of address for the multihomed mobile node.

The multihomed mobile node according to another embodiment of the invention is further operable to perform the steps of the method for enabling simultaneous use of a plurality of interfaces by a multihomed mobile node according to one of the various embodiments and variations thereof described herein.

Moreover, another embodiment of the invention provides a proxy of a multihomed mobile node for enabling simultaneous use of a plurality of interfaces by a multihomed mobile node being attached to a home network through one of the plurality of interfaces and to at least one foreign network through at least another interface of the plurality of interfaces. The proxy may comprise a processing means for initiating the registration of an address in the home network to which the multihomed mobile node has attached as a care-of address for the multihomed mobile node in the home network at a home agent serving the multihomed mobile node in the home network and a receiver for receiving network layer packets through the home network in response to the registration of the address as a care-of address for the multihomed mobile node. This address to be registered as a care-of address for the multihomed mobile node in the home network may for example be a home address of the multihomed mobile node in the home network or an address of a network node being located in the home network.

According to another embodiment of the invention, the proxy is further operable to perform the steps of the method for enabling simultaneous use of a plurality of interfaces by a multihomed mobile node according to one of the various embodiments and variations thereof described herein.

Even further, another embodiment of the invention relates to a computer readable medium storing instructions that, when executed by a processor of a home agent serving a multihomed mobile node in a home network of the multihomed mobile node upon attachment of a multihomed mobile node to the home network, cause the home agent to receive a binding update for registering an address in the home network as a care-of address for the multihomed mobile node, wherein the address to be registered as a care-of address for the multihomed mobile node in the home network is a home address of the multihomed mobile node in the home network or an address of a network node located in the home network and to add the address as a care-of address to a binding cache maintained by the home agent.

In another embodiment of the invention, the computer readable medium further stores instructions that, when executed by the processor of a home agent, cause the home agent to perform the steps of the method performed by the home agent according to one of the various embodiments and variations thereof described herein.

Another embodiment provides a computer readable medium storing instructions that, when executed by a processor of a multihomed mobile node or a proxy acting on behalf of the multihomed mobile node, cause the multihomed mobile node or proxy to enable simultaneous use of a plurality of interfaces by the multihomed mobile node being attached to a home network through one of the plurality of interfaces and to at least one foreign network through at least another interface of the plurality of interfaces, by initiating the registration of an address in the home network to which the multihomed mobile node has attached as a care-of address for the multihomed mobile node in the home network at a home agent serving the multihomed mobile node in the home network, wherein the address to be registered as a care-of address for the multihomed mobile node in the home network is a home address of the multihomed mobile node in the home network or an address of a network node located in the home network and by receiving network layer packets through the home network and the at least one foreign network in response to the registration of the address as a care-of address for the multihomed mobile node.

In another embodiment of the invention, the computer readable medium further stores instructions that, when executed by the processor of a multihomed mobile node or the proxy acting on behalf of the multihomed mobile node, cause the multihomed mobile node or the proxy to perform the steps of the method for enabling simultaneous use of a plurality of interfaces by a multihomed mobile node according to one of the various embodiments and variations thereof described herein.

BRIEF DESCRIPTION OF THE FIGURES

In the following the invention is described in more detail in reference to the attached figures and drawings. Similar or corresponding details in the figures are marked with the same reference numerals.

FIG. 5 shows an exemplary binding update message according to an embodiment of the invention, FIG. 6 shows an exemplary binding unique identification sub-option that may be included in the binding update message of FIG. 5 according to an embodiment of the invention, FIG. 7 shows an exemplary binding cache at an SAE anchor/home agent according to an exemplary embodiment of the invention, FIG. 8 shows an exemplary neighbor cache maintained by an SAE anchor/home agent according to an exemplary embodiment of the invention, and FIG. 9 shows an exemplary routing table maintained by an SAE anchor/home agent according to an exemplary embodiment of the invention.

DETAILED DESCRIPTION OF THE INVENTION

Figure 1:
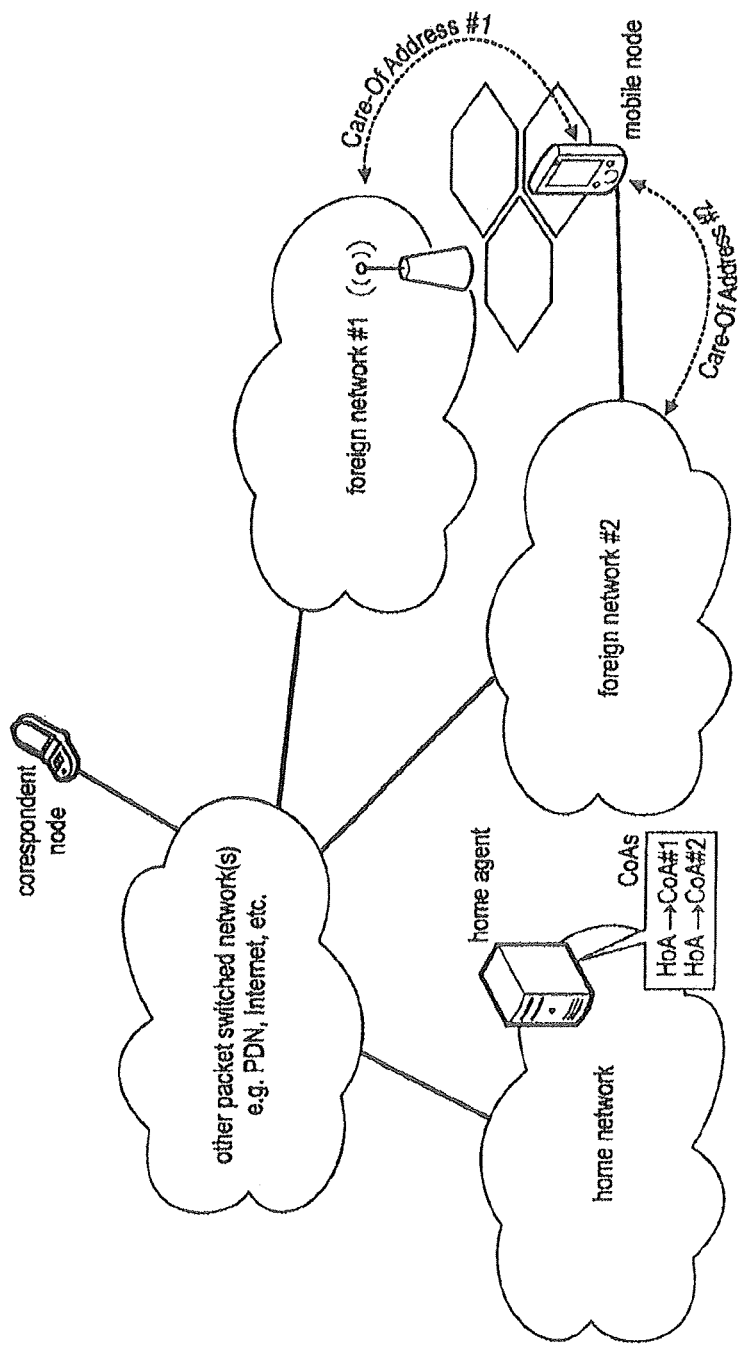
FIG. 1 shows an exemplary network in which a multihomed mobile node has registered multiple care-of addresses at its home agent in the multihomed mobile node's home network, FIG. 2 exemplarily illustrates the removing of all bindings in the binding cache of the multihomed mobile node when returning home, though the multihomed mobile node is still connected to a foreign network, FIG. 3 exemplarily illustrates the multihomed mobile node registering plural care-of addresses at the home agents binding cache according to an exemplary embodiment of the invention, wherein the care-of addresses include a home address local address.
Figure 2:
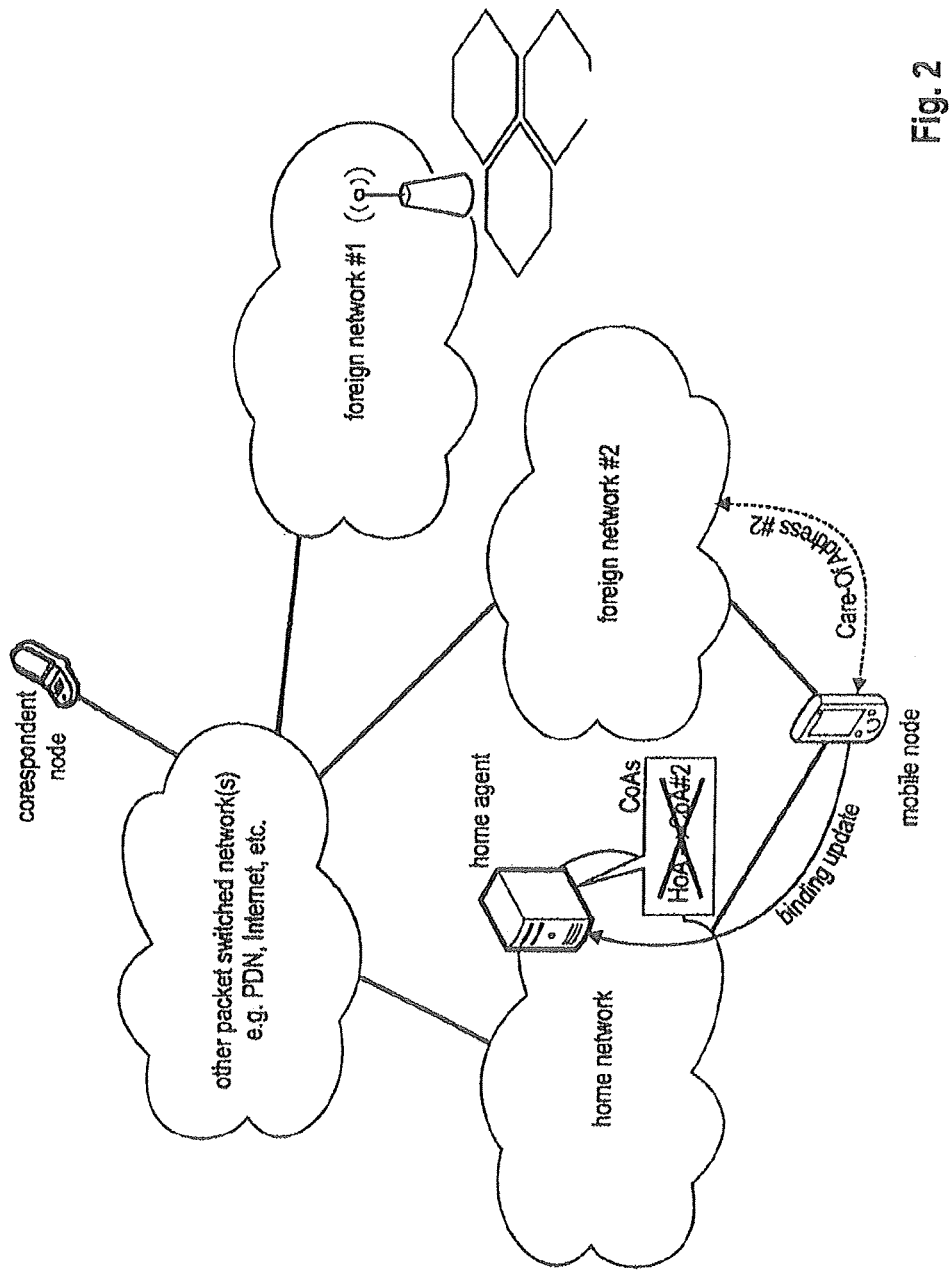

The following paragraphs will describe various embodiments of the invention. For exemplary purposes only, most of the embodiments are outlined in relation to an (evolved) UMTS communication system according to the LTE discussed in the Background Art section above. It should be noted that the invention may be advantageously used for example in connection with a mobile communication system such as the LTE UMTS communication system previously described, but the invention is not limited to its use in this particular exemplary communication network.

Accordingly, also the terminology used herein mainly bases on the terminology used by the 3GPP and by the IETF in the standardization of Mobile IPv6. However, the terminology and the description of the embodiments with respect to an LTE (UMTS) architecture and Mobile IPv6 is not intended to limit the principles and ideas of the inventions to such systems and the use of this protocol only.

The explanations given in the Technical Background section above are intended to better understand the mostly LTE specific exemplary embodiments described herein and should not be understood as limiting the invention to the described specific implementations of processes and functions in the mobile communication network. Nevertheless, the improvements proposed herein may be readily applied in the architectures/systems described in the Technological Background section and may in some embodiments of the invention also make use of standard and improved procedures of these architectures/systems.

Definitions

In the following a definition of several terms frequently used in this document will be provided.

A network node or mobile node is a physical entity within a network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or nodes.

An address of a node or network entity is a global or site-local identifier of the node or network entity being either of permanent or temporarily limited validity. Typically, in some of the embodiments herein an address is a network layer address, i.e., is used for identification of nodes and network entities on the network layer of the OSI reference model (see for example the textbook "Computer Networks", by Andrew S. Tanenbaum, fourth edition, 2003, Prentice Hall PTR, chapter 1.4 incorporated herein by reference). The network layer or Layer 3 typically provides the functional and procedural means for transferring variable length packets from a source to a destination via one or more networks. In some embodiments of the invention, an address is identifying a tunnel endpoint between a first network node/functional entity and a second network node/functional entity, such as for example an IP-over-IP tunnel or a GTP tunnel.

Typically, an interface of a host or a network node is assigned one address. However, also multiple addresses may be assigned to a single interface. Further, in case of a network node comprising plural network entities, an address may be associated to a logical interface of the network entity.

A home address is an address assigned to a mobile node, used as the permanent address of the mobile node. This address is within the mobile node's home network. A mobile node may have multiple home addresses, for instance when there are multiple home networks, or a mobile node may have multiple home addresses in a single home network.

A care-of address is an address associated with a mobile node while visiting a foreign network. A mobile node may have one or more care-of addresses simultaneously.

A home network of a mobile node is typically identified by the location of the home agent at which the mobile node registers its care-of address(es) for a given home address of the mobile node.

In some embodiments of the invention the IPv6 protocol is used on the network layer. In this case the address is an identifier for a single (logical) interface of a host or network entity such that a packet sent to it from another IPv6 subnet is delivered via a lower-layer link to the interface identified by that address.

A home agent is a router or a functional entity providing a routing function on a mobile node's home network with which the mobile node registers its current care-of address (es). While the mobile node is away from home, the home agent may intercept packets on the home link destined to the mobile node's home address, encapsulate them, and tunnel them to one of or some of the mobile node's registered care-of address(es).

A binding is an association of the home address of a mobile node with a care-of address for that mobile node. in some embodiments of the invention the remaining lifetime of that association and/or a binding unique identification (BID) number (also referred to as binding unique identifier) is also considered part of the binding. The binding unique identification number is an identification number used to distinguish multiple bindings registered by the mobile node. The assignment of distinct BID allows a mobile node to register multiple bindings for a given mobile node (home address) while avoiding duplication of bindings.

Bindings are generated by way of registration which denotes a process during which a mobile node or a proxy sends a binding update to the mobile node's home agent (or a correspondent node), causing a binding for the mobile node to be registered. The bindings may for example be stored in a binding cache.

A multihomed mobile node is a mobile node that has several addresses to choose between. For instance the multihomed mobile node may have multiple interfaces and may be connected to different access networks simultaneously.

Each network is identified by at least one number. This number allows for routing of packets to the nodes in the network. Furthermore, this number refers to a pool of identifiers that can be used by the nodes in the network. An address in a network is an identifier out of the pool of identifiers. For example in IPv6, the number of a network is the IPv6 prefix and the address in a network is the IPv6 address composed of the IPv6 prefix and an IPv6 host part.

In different networks, for example in a home network and a foreign network, different addresses are used.

Overview on the Invention

As has been explained above, the Mobile IPv6 protocol does not allow for using a link to a foreign network and a link to a mobile node's home network simultaneously. If the mobile node registers in the home network by sending a binding update to the home agent, the home agent discards all binding from the binding cache. Further, the home agent will stop performing proxy neighbor discovery on behalf of the mobile node. Hence, in case a multihomed mobile node would be able to use another link to a foreign network for communication upon returning home (i.e., attaching to the access network of the home network) there are generally two options that a mobile node has: either the mobile node exclusively used its link to the home network after having attached thereto, or alternatively it may not register itself at the home agent, so that all traffic will still be routed to the mobile node using its care-of address in the foreign network, i.e., exclusively through the foreign network.

According to one aspect and embodiment of the invention it is suggested that a mobile node (or a proxy acting on behalf of the mobile node) registers an address in the home network as a care-of address for the multihomed mobile node at the home agent when the multihomed mobile node connects or is connected to the home network. The address in the home network registered as a care-of address for the multihomed mobile node may for example be the multihomed mobile node's home address in the home network, the address of the proxy acting on behalf of the multihomed mobile node or the address of another network node or functional entity in the home network located in the data distribution path between home agent and multihomed mobile node.

If for example Mobile IPv6 is used, the protocol may need to be extended so as to allow the home agent to register a mobile node's home address as a care-of address, which is presently not allowed according to the Mobile IPv6 protocol specified in RFC3775. Moreover, in some embodiments of the invention the home agent may further act as a proxy for the mobile node and perform proxy neighbor discovery for the mobile node while the mobile node is connected/attached to its home network.

In order to enable the use of several links (including that to the mobile node's home network) another aspect and embodiment of the invention relates to allowing the registration of more than one care-of address in the binding cache of the home agent.

For distinction of individual bindings of a mobile node, one embodiment of the invention foresees to introduce a binding unique identification number that is associated with an individual binding or a group of bindings so as to allow the management (e.g., addition, deletion, update, etc.) of individual bindings in the binding cache. For this purpose, another embodiment of the invention suggests an enhanced binding update message of the Mobile IPv6 protocol specified in RFC 3775.

Figure 3:
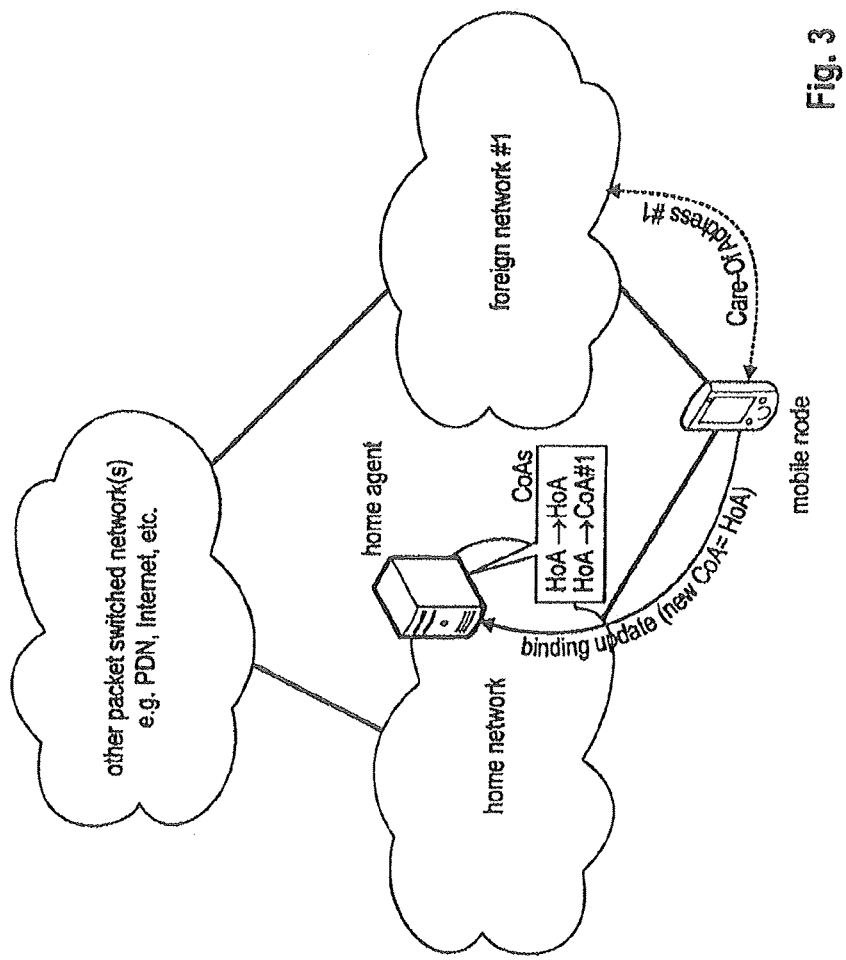

FIG. 3 shows an exemplary network overview used for highlighting these aspects of the invention. A multihomed mobile node is connected to foreign network #1 and has attached to its home network. For exemplary purposes, home network and foreign network are both interconnected through another packet switched network or networks, such as the internet or a packet data network (PDN). In the exemplary embodiment shown in FIG. 3, a multihomed mobile node implementing a mobility management protocol (such as Mobile IPv6) is moving from foreign network #1 to its home network.

It should be noted that the home network may also be provided with another mobility management protocol that is specific to the home network and that handles mobility between networks of the same kind and/or within the access system of the home network. This is however not of essential interest for the principles of the invention.

Further, it is assumed in this example that the mobile node has registered a care-of address at its serving home agent in the home network that is used to route data packets to the mobile node through the foreign network (using the care-of address).

Having attached to the home network (i.e., when having established connectivity to the home network, e.g., to an access network of the home network), the mobile node desires to maintain connectivity to the foreign network through a foreign link for communication. Hence, instead of sending a binding update deregistering (all of) its care-of address(es) at the home agent, the multihomed mobile node sends a binding update to the home agent that requests the home agent to register the home address of the mobile node (in the home network) as a care-of address in the home network. Alternatively the binding update may also be sent by a proxy node in the home or foreign network on behalf of the multihomed mobile node. Accordingly the binding update may be transported to the home agent either through the home network or the foreign network to which it is connected. Further, as explained above also another address in the home network than the multihomed mobile node's home address could be registered as a care-of address of the multihomed mobile node. For example, an address of a proxy in the home network acting on behalf of the multihomed mobile node may be registered according to another embodiment of the invention.

The home agent updates the binding cache in response to receiving the binding update. As illustrated in FIG. 3 for exemplary purposes, a new binding indicating the registration of the multihomed mobile node's home address as a care-of address is added to the binding cache of the home agent. The binding updates for registering the multihomed mobile node's care-of address(es) may comprise a BID for distinguishing and/or identifying individual bindings of the multihomed mobile node. By detecting the registration of the multihomed mobile node's home address or an address in the home network (for example by the address prefix) as a care-of address the home agent may further recognize from the binding cache entries for the multihomed mobile node that the multihomed mobile node is connected to the home network and simultaneously to another foreign network.

Having registered the new binding for the multihomed mobile node (e.g., the home address has been registered as a care-of address in the home network), the home agent may now route data packets destined to the multihomed mobile node either through the home network or the foreign network. Which network to choose for data delivery may for example be decided based on filter rules or policies at the home agent.

In a variation of this embodiment, the home agent may act as a proxy for the multihomed mobile node concerning neighbor discovery in the home network. This means that the home agent answers requests for the multihomed mobile node link layer address and by indicating its own link layer address to the requesting nodes or entity so that the data packets destined to the network layer address of the multihomed mobile node will be forwarded to the home agent's link layer address. In another variation of the embodiment, a proxy acting on behalf of the multihomed mobile node performs neighbor discovery functions for the multihomed mobile node upon having registered a care-of address in the home network. Similar to the variation described before the proxy provides the link layer address of the home agent when answering requests for the multihomed mobile node link layer address.

Generally, the registration of the home address of a mobile node or an address in the home network as a care-of address for the multihomed mobile node within the home network may already be sufficient to enable the mobile node to receive data not only through its home network but also through a potentially further (foreign) network.

However, in some embodiments of the invention it has to be further ensured that appropriate measures are foreseen in the home network so as to ensure a correct routing of data packets destined to the mobile node through its home network. In these embodiments of the invention, an update of the distribution path of user plane data packets destined to the multihomed mobile node may be foreseen in order to deliver the data packets to the multihomed mobile node through the home network. This update of the distribution path may for example be accomplished by updating the routing in the home network by an appropriate manipulation of routing or switching entries.

Overview of an Exemplary Network Architecture

Figure 4:
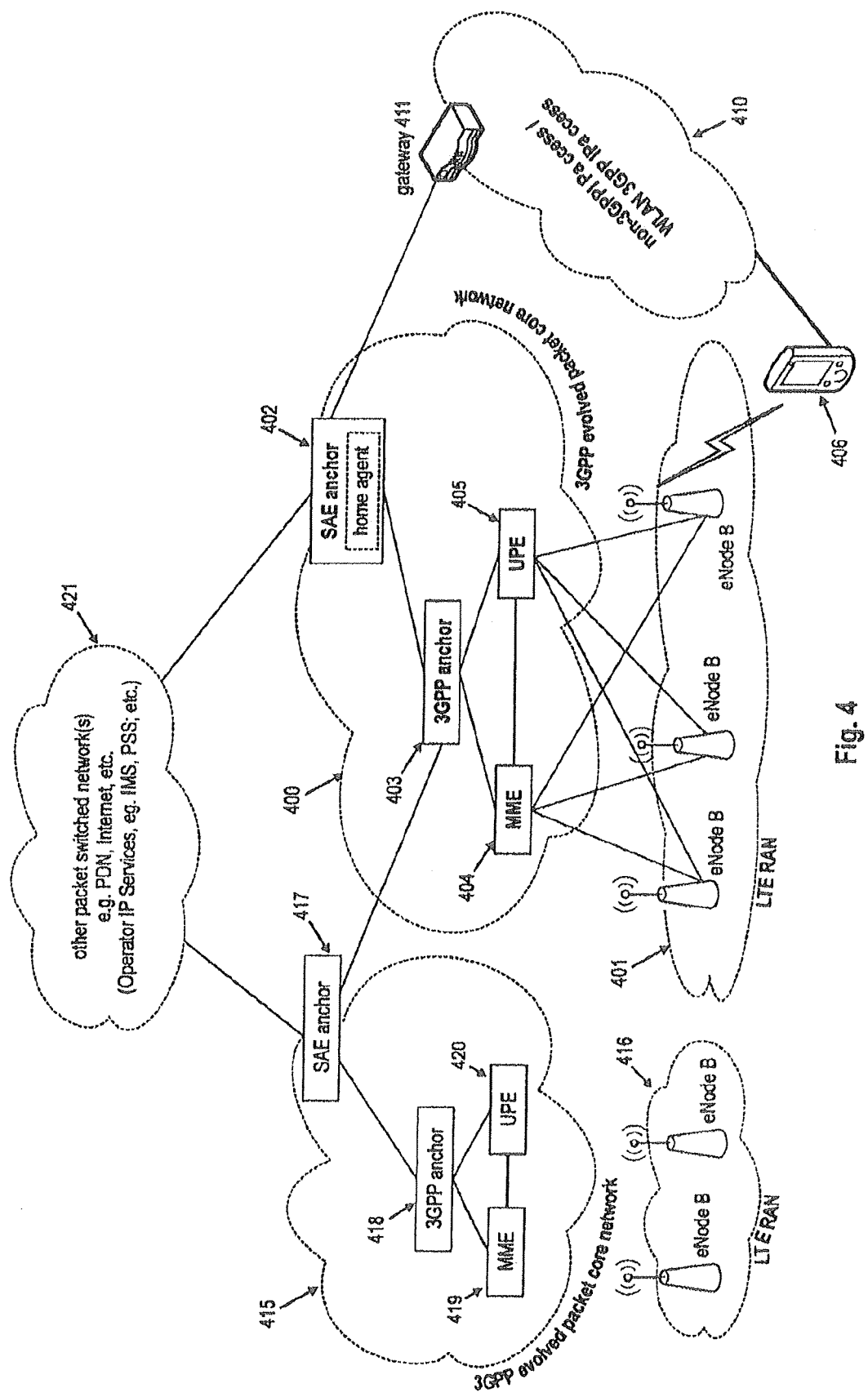
FIG. 4 shows a more detailed overview of an exemplary system architecture in which the invention may be implemented according to one embodiment of the invention.

FIG. 4 shows an overview of an exemplary network architecture in which the invention may be implemented. In this example, the home network of the multihomed mobile node 406 is separated into a core network, such as 3GPP evolved packet core network 400, and a radio access network, such as LTE radio access network (RAN) 401. In the radio access network plural base stations, such as enhanced Node Bs, may be provided to provide connectivity to the mobile nodes via an air interface.

The 3GPP evolved packet core network 400 comprises an inter access system anchor (IASA) that is a functional entity in the evolved 3GPP architecture. The entity may be logically split into an SAE anchor 402 and a 3GPP anchor 403. In FIG. 4, the IASA is not depicted, but its functional entities (SAE anchor 402 and a 3GPP anchor 403) are shown. The IASA may for example be responsible for the following functions:
  Packet routing and forwarding;
  Authentication, authorization and key management, for mobility management signaling or for PDN access control (optional);
  Policy and Charging Enforcement Function (PCEF);
  Collection of Charging Information for online or offline charging systems;
  Mobility Anchor for mobility between 3GPP accesses and non-3GPP accesses;
  Gateway functionality to PDN including IP address allocation from PDN address space;
  Inter-3GPP access system mobility anchor (optional).

The SAE anchor 402 is a functional entity that anchors the user plane for mobility between 3GPP access systems and non-3GPP access systems. In this exemplary embodiment, the home agent is collocated with the SAE anchor 402 of the multihomed mobile node 406, i.e., either comprises home agent functionality or the functional entities of SAE anchor 402 and home agent are provided in a single network node.

The 3GPP anchor 403 is a functional entity that anchors the user plane for mobility between the 2G/3G access systems and the LTE access system and is thus also responsible for routing the data packets destined to/received from mobile nodes attached to the radio access network. It is assumed that the 3GPP anchor is an anchor for user plane traffic from/to mobile nodes attached to the LTE RAN.

Further, the core network comprises at least one mobility management entity 404. A mobility management entity (MME) manages and stores the context information for the mobile nodes (referred to as UEs in the 3GPP terminology). For example, when in idle state the UE/user identities, UE mobility state, and user security parameters are maintained in the context of the MME. The MME may further generate temporary identities and allocate them to mobile nodes/UEs. It may further check the authorization whether the mobile node/UE may camp on the tracking area (TA) or on the public land mobile network (PLMN) and may also authenticate user. The main MME functions may thus be summarized as:
  Management and storage of UE control plane context;
  Mobility management of UEs in the LTE RAN;
  Authentication, authorization (PLMN, TA) and key management.

Moreover, the core network further comprises one or more user plane entities 404. A user plane entity (UPE) terminates the downlink data path for idle state UEs and triggers/initiates paging when downlink data arrive for the UE. The UPE commonly manages and stores UE contexts, e.g., parameters of the IP bearer service or network internal routing information. It performs replication of the user traffic in case of interception. The main UPE functions are thus:
  Packet routing and forwarding;
  Ciphering termination for user plane traffic;
  IP Header compression;
  Inter-eNode B Mobility Anchor for user plane.

It should be noted that the functions assigned to the 3GPP anchor may also be distributed to the MME and/or the UPE and/or the SAE anchor.

Another embodiment of the invention further foresees the integration of a localized mobility management scheme in the architecture shown in FIG. 4. In order to hide mobility within an access network from the multihomed mobile node, a network-based, localized mobility management can be used. A protocol supporting network-based, localized mobility (also known as NetLMM) allows a mobile node to move around in a localized mobility domain, changing the point of attachment within the domain, but without recognizing the change at the network layer, and maintaining seamless communication.

Two protocol entities are typically defined for NetLMM, a Mobile Access Gateway (MAG) and a Local Mobility Anchor (LMA). Further, there may be also a set of messages defined that are exchanged between MAG and LMA. Together, these specifications may make mobility events transparent to the mobile nodes at the network layer. For example when a mobile node hands over from one MAG to another MAG, the new MAG sends a location registration to the LMA in order to inform the LMA about the new location of the mobile node.

A local mobility anchor (LMA) may for example be a router or a functional entity in a network node providing routing functionality that terminates connections to multiple Mobile Access Gateways, services mobility requests for mobile nodes moving within a NetLMM (Network-based Localized Mobility Management) system, and participates in the NetLMM protocol exchange.

The LMA may thereby maintain reachability to a mobile node's address while the mobile node moves around within the NetLMM infrastructure. The LMA may be further responsible to maintain forwarding information for the mobile nodes which includes a set of mappings to associate mobile nodes by their identifiers with their address information, associating the mobile nodes with their serving MAGs and the relationship between the LMA and the MAGs. There may be one or more LMAs in a NetLMM infrastructure.

A Mobile Access Gateway (MAG) is a router embedded in a device or a functional entity therein that terminates a specific link layer technology to which mobile nodes attach themselves. It terminates one end of the MAG of the connection to one or more Local Mobility Anchors and participates in the NetLMM protocol exchange. Typically a MAG is a router/routing entity that a mobile node is attached to as the first hop router in the NetLMM infrastructure. The MAG may be connected to the mobile node over some specific link provided by a link layer but the NetLMM infrastructure is agnostic about the link layer technology that is used. Each MAG has its own identifier used in NetLMM protocol messaging between the MAG and the LMA. The important interfaces between link layer specific functions and the NetLMM function reside on the MAG. There may be multiple MAGs in a NetLMM infrastructure.

There are different possibilities how network-based, localized mobility management may be applied in an evolved 3GPP architecture and how the NetLMM entities may be mapped to the different 3GPP entities. For example:
The LMA may be collocated with the SAE anchor. Here the LMA may be separated from the home agent or may be even combined with the home agent;
The LMA may also be collocated with the 3GPP anchor;
The MAG may be collocated with the 3GPP anchor (in case LMA is collocated with SAE anchor);
The MAG may be collocated with the UPE (in case LMA is collocated with 3GPP anchor or SAE anchor);
The MAG may be collocated with the MME (in case LMA is collocated with 3GPP anchor or SAE anchor).

Registration of Care-of Addresses

Format of the Binding Update

According to an exemplary embodiment of the invention the binding update (BU) message is used by a mobile node to notify other nodes of a new care-of address for itself. According to one aspect of the invention a binding update may also indicate a mobile node's home address as a care-of address even if the mobile node is attached to its home network. If needed, the binding unique identifier sub-option including the BID of a registration may be included in the binding update.

In one exemplary embodiment, MIPv6 is used for mobility management. In this embodiment, the binding update may be similar to the binding update defined in RFC 3775, Section 6.1.7. The structure of the binding update as defined in MIPv6 is shown in FIG. 5.

The care-of address of the multihomed mobile node may be for example specified either by the source address field in the IPv6 header or by an alternate care-of address option, if present. In contrast to standard MIPv6, the binding update is not silently discarded if the care-of address appears as a home address in an existing binding cache entry.

In one embodiment of the invention, the home agent does not remove any previously registered binding for a mobile node when receiving a binding update. In this embodiment, the home agent may register each binding received without deleting previous bindings from the binding cache. Hence, multiple bindings (i.e., care-of address registrations) for a multihomed mobile node are possible.

To manage the bindings of a multihomed mobile node, the home agent could for example delete individual bindings (or all bindings) upon receiving an explicit request or upon expiry of the lifetime of a binding/the bindings. This could for example be implemented by adding an additional flag to a binding update that indicates whether the care-of address included in the binding update is registering a new binding or requests the deletion of the binding corresponding to the indicated address. In another exemplary implementation, the binding update message is not extended, but the registration of a care-of address is deleted by "registering" the care-of address again and setting the lifetime field to zero or any arbitrary value indicating that a deletion of a binding from the binding cache is requested.

Alternatively, in another embodiment of the invention, the binding update known from MIPv6 may be extended by a binding unique identifier sub-option. Further, the BID sub-option may be optionally included in the binding acknowledgment, binding refresh request, or binding error messages.

An exemplary BID sub-option according to one exemplary embodiment of the invention is shown in FIG. 6. This exemplary sub-option may be added to one of the before-mentioned messages of the MIPv6 protocol. In particular the BID sub-option may for example be added as a mobility option (see FIG. 5) to a binding update.

The type value of the BID sub-option is set to indicate that a BID sub-option is included in the binding update. The length value may be set to different values to indicate whether the C flag in the sub-option is set or not. E.g., if this value is set to 4, the C flag is unset; if it is set to 20 the C flag is set.

Binding Unique ID (BID) includes an identifier assigned to the binding carried in the binding update with this sub-option. For example, the BID may be 16-bit unsigned integer.

When the BID sub-option is included in a binding update, the Priority/Status field indicates the priority field assigned to each binding. The receiver may utilize this priority to determine which binding is used to deliver data packets destined to the multihomed mobile node to the multihomed mobile node. For example, the priority/status could be an 8-bit unsigned integer. A value of zero could for example indicate that no priority is assigned to the binding; the higher the value the higher the higher the priority of the binding. Further, it should be noted that the presence of the Priority/Status field could be optional.

When the binding unique identifier sub-option is included in a binding acknowledgment, the Priority/status field may indicate the status correspondent to each binding in a bulk registration mode. The mobile node may thereby be informed on the registration status of each binding. The value of the status field may indicate whether a registration of a binding/bindings has been successful or not.

In some embodiments of the invention optional Care-of Address (C) flag of the BID sub-option may indicate that the mobile node can store a care-of address correspondent to BID in the binding unique identifier sub-option. This flag may for example be included to the BID sub-option whenever the multihomed mobile node sends multiple bindings in a single binding update, i.e., a bulk registration is requested.

Another field in the binding unique identifier sub-option may be the Removable (R) flag that may for example be set for indicating that a mobile node requests a home agent to remove the binding correspondent to BID, even if the binding update is not for de-registration. However, the inclusion of this flag may be implementation specific and is thus optional.

In another embodiment of the invention, the binding update may further include IP flow filter information that define filter policies according to which the home agent may decide which binding to use for forwarding or transmitting data packets destined to the multihomed mobile node.

FIG. 7 shows an exemplary binding cache at an SAE anchor/home agent according to an exemplary embodiment of the invention. In the left-hand column of the binding cache the multihomed mobile node for which the binding in a respective row of the table is valid is indicated by its home address for which the home agent serves the respective multihomed mobile node in the home network. For example, the first three bindings in the table are associated to a first multihomed mobile node that has a home address HoA#1. The 4th and 5th binding are for another, second multihomed mobile node having a home address HoA#2. For each binding the binding cache indicates an associated care-of address. For the first two bindings for multihomed mobile node with home address HoA#1, two care-of addresses CoA#1 and CoA#2 in foreign networks are present. The 3rd binding of multihomed mobile node with home address HoA#1 is indicating the multihomed mobile node's home address HoA#1 as its care-of address. Hence, this entry is a binding of the multihomed mobile node for its own home network served by the home agent maintaining the binding cache.

For the multihomed mobile node with HoA#2, two care-of addresses CoA#3 and CoA#4 have been registered, which indicated that the multihomed mobile node has connectivity to two foreign networks.

Further, each binding may optionally contain a lifetime field that indicates a number of time units remaining before the binding is considered expired by the home agent. Optionally each binding comprises a home registration flag that indicates, when set, that the home agent should act as the multihomed mobile node's home agent. Further, a binding may comprise a sequence number field that may be used to control the reception of binding updates. Further optionally, a binding may comprise usage options.

As explained above, in some embodiments of the invention a binding further comprises a BID field to manage individual bindings of a multihomed mobile node. Moreover, another optional field in a binding may be the priority of a binding. The priority may for example facilitate the selection of a binding out of the bindings registered for a multihomed mobile node to transmit, relay or forward data packets destined to the multihomed mobile node's home address using the care-of address of the selected binding. Further, a binding may optionally comprise filter information that may be used by the home agent to decide which binding(s) to use to transmit, relay or forward data packets destined to the multihomed mobile node's home address. In a variation also the priority assigned to the bindings may be taken into account when making this decision.

Registration of the Care-of Address

According to one embodiment of the invention, the multihomed mobile node registers its own home address in the home network as a care-of address using a binding update. This may for example be accomplished using MIPv6 signaling over the home network (e.g., through the home network's access network). The home address of the multihomed mobile node is thus registered as a care-of address for the home address of the multihomed mobile node.

Alternatively in another embodiment of the invention, the binding update may also include the multihomed mobile node's link layer network conformant link-layer address. The home agent may then forward packets destined for the home link interface to this link layer address.

Another embodiment of the invention foresees that the binding update includes an identifier of a network node/functional entity within the home network. For example, such network node/functional entity could be a UPE or a 3GPP anchor in the 3GPP evolved packet core network 400 (see FIG. 4) or a proxy acting on behalf of the multihomed mobile node. The identifier of the network node may be for example known to the mobile node as a result of the attachment procedures upon connecting to the home network or as a result of the tracking area update procedure during mobility. If using NetLMM, possible network nodes/functional entities may for example be the LMA or MAG.

The identifier may be an address of the respective network node/functional entity such as for example an IPv6 address or a link layer address of the respective network node/functional entity.

Transmission of the Binding Update

In some embodiments of the invention, the binding update is transmitted via the home network to the home agent. In another embodiment of the invention the binding update is transmitted through a foreign network to which the multihomed mobile node is attached. Further, if the multihomed mobile node sends the binding update the binding update may be simultaneously sent via more than one network to the home agent, e.g., through the home network and at least one further foreign network or through two or more foreign networks.

As indicated above the binding update may be sent by the multihomed mobile node. Another option is that a network node/functional entity acting as a proxy for the multihomed mobile node transmits the binding update to the home agent.

Thereby, the multihomed mobile node may either explicitly request the network node/functional entity to do so. Alternatively, the sending of the binding update by a proxy may be implicitly triggered by signaling between the multihomed mobile node and the proxy or by the proxy receiving a trigger from another network node/functional entity in the home network or a foreign network.

In an embodiment of the invention, one proxy entity that may act on behalf of the multihomed mobile node when sending the binding update is the 3GPP anchor. For example, the multihomed mobile node could explicitly or implicitly request the 3GPP anchor to send the binding update upon having attached to the access network of the home network, e.g., the LTE RAN 401 in FIG. 4. In another alternative embodiment of the invention, the binding update may also be sent by the MME or UPE upon explicit or implicit request from the multihomed mobile node.

In the examples above, MME or UPE (respectively) may also trigger the transmission of the binding update on behalf of the multihomed mobile node. This may for example be feasible if the multihomed mobile node does not implement MIPv6 but UPE or MME act as a proxy for the multihomed mobile node as specified in "Network Based Layer 3 Connectivity and Mobility Management for IPv6", February 2006, by Chowdhury et al., available at http://www.ieff.org, incorporated herein by reference. According to this document and this example, the multihomed mobile node may connect to a target base station (such as an eNode B) in an inter access router handoff after having updated the binding. However, in the SAE anchor and the access network, such as the LTE RAN, the multihomed mobile node is connected before its binding is updated by means of a binding update.

Another embodiment of the invention relates to cases where NetLMM is used in the home network for localized mobility management, i.e., home network wide mobility management. In this case the LMA as a network node or functional entity could send the binding update on behalf of the multihomed mobile node.

In one example, the LMA is a functional entity collocated with the SAE anchor. In this exemplary case, the mobile node may initiate the transmission of the binding update from the LMA to the home agent also being a functional entity in the SAE anchor via an SAE anchor internal interface. Alternatively, if a proxy acts on behalf of the multihomed mobile node, the 3GPP anchor in the home network may trigger the sending of the binding update by the LMA on behalf of the multihomed mobile node upon receiving an explicit or implicit trigger.

If the LMA is a functional entity collocated with 3GPP anchor, a similar solution as proposed above may be used where the 3GPP anchor, i.e., its LMA function, sends the binding update.

Proxy Neighbor Discovery

In case the multihomed mobile node is away from home, i.e., is not attached to the home network where its home agent is located, the home agent will perform proxy neighbor discovery functions for the multihomed mobile node. This means that the home agent answers requests for resolving the multihomed mobile node link layer address on behalf of the multihomed mobile node thereby indicating the home agent's link layer address to the requesting entity or node. Upon the multihomed mobile node returning home, according to one embodiment of the invention, the home agent performs proxy neighbor discovery functions for the multihomed mobile node. For example, upon receiving the binding update indicating a care-of address of the multihomed mobile node in the home network, the home agent may continue to act as a proxy for the multihomed mobile node and may answer neighbor solicitations for resolving the multihomed mobile node's link layer address by sending a neighbor advertisement including its link layer address.

Optionally, the binding update may contain a flag that indicates to the home agent whether to perform neighbor discovery functions on behalf of the multihomed mobile node or not upon the multihomed mobile node attaching to its home network.

In another embodiment of the invention, the home agent stops performing neighbor discovery functions upon receiving a binding update for the multihomed mobile node having attached to the home network. In this embodiment a proxy in the home network, for example 3GPP anchor 403 or UPE 405 in FIG. 4, may perform neighbor discovery functions on behalf of the multihomed mobile node. The same solution may also apply in scenarios where the multihomed mobile node does not implement MIPv6, but "Proxy MIP" as described in "Network Based Layer 3 Connectivity and Mobility Management for IPv6" mentioned above is used.

In the embodiments described above, the multihomed mobile node may not be answering neighbor solicitations when being connected to the home network and having registered a care-of address in the home network.

Adaptation of the Data Path in the Home Network

In some embodiments of the invention, the data plane route of data packets destined to the multihomed mobile node is updated upon the registration of a care-of address for the multihomed mobile node in its home network in response to the binding update. This may for example require an update of the routing table/neighbor cache in SAE anchor comprising the home agent.

In some embodiments of the invention the neighbor cache is a "table" that allows the resolution of a link layer address of the next hop towards the multihomed mobile node when sending data packets to the multihomed mobile node through the home network or a foreign network. E.g., if the home agent has chosen one (or more) care-of address by means of which the link layer address of the next hop may be resolved.

Considering for exemplary purposes the architecture in FIG. 4, the home agent in SAE anchor 402 could transmit or forward data packets to the multihomed mobile node through the home network (consisting of the 3GPP evolved packet core network 400 and the LTE RAN 401) or through the foreign network, i.e., non-3GPP based network/WLAN 3GPP IP network 410. If the home agent decides to utilize the care-of address of the multihomed mobile node 406 in the foreign network, it may resolve the link layer address for the next link layer hop to gateway 411.

Assuming that SAE anchor 402 with the home agent and the gateway 410 are both located within a common link layer network, the resolution will indicate the gateway 410 as the next hop on the link layer.

Alternatively, the routing table in the SAE anchor 402 may indicate to the home agent a network layer address specifying the next hop on, e.g., an IP based network that is interconnecting the home and foreign network. By means of this network layer address the home agent may resolve the link layer address of the next hop (e.g., router) by utilizing the neighbor cache maintained within the SAE anchor 402.

If deciding to transmit or forward data packets destined to the multihomed mobile node through the home network, the neighbor cache could, e.g., indicate the link layer addresses of the 3GPP anchor 403 or UPE 405, so that—on the link layer—the data packets are provided to the 3GPP anchor 403 or UPE 405, respectively, which then forward the data packets further downstream to the multihomed mobile node, e.g., via a eNode B to which the multihomed mobile node is connected.

FIG. 8 shows an exemplary neighbor cache maintained by an SAE anchor/home agent according to an exemplary embodiment of the invention. As indicated therein, the neighbor cache may be considered a table that is allowing to determine a link layer address of a next hop on the link layer for a given network layer address. For example, if a network node or functional entity needs to send, forward or relay a network layer data packet to a destination on the same link-layer network, it may look up the link layer address of the destination network layer address in the neighbor cache. For example, if an IP packet is to be sent to the IP address IP#2, the link layer protocol of the network node or functional entity will look up the link layer destination address from the neighbor cache and transmits the IP packet encapsulated in a link-layer packet to the link layer address indicated in the neighbor cache.

In another embodiment, the network nodes in the 3GPP packet core network 400 use the IP protocol on the network layer. In these cases it is also possible that the (IPv6) data packets the home agent is transmitting or forwarding are provided to the next hop on the user data path to the multihomed mobile node through IP-over-IP tunneling.

For example, if the downlink distribution path would be SAE anchor 402 (home agent)→3GPP anchor 403→UPE 405→eNode B→multihomed mobile node 606, then the home agent may use an IP tunnel between SAE anchor 402/home agent and the 3GPP anchor 403 to provide the data packets to the 3GPP anchor 403. For this purpose, the tunnel endpoint between home agent and 3GPP anchor 402 should be registered as a care-of address for the multihomed mobile node 406 in the home network within the binding cache. Further, also between the 3GPP anchor 403 and UPE 405 an(other) IP-over-IP tunnel may be used for providing the packets from 3GPP anchor 403 to UPE 405. Alternatively, the IP-over-IP tunnel may also be established between SAE anchor 402/home agent and UPE 405.

Concerning the connection between UPE 405 and the eNode B serving the multihomed mobile node 406 in LTE RAN 401, a GTP tunnel may be used for data packet exchange. For more details on the known GTP protocol, see 3GPP TS 29.060, "General Packet Radio Service (GPRS), GPRS Tunnelling Protocol (GTP) across the Gn and Gp interface", version 7.2.0 of June 2006 incorporated herein by reference.

In another alternative embodiment of the invention, the downlink distribution path may be SAE anchor 402 (home agent)→UPE 405→eNode B→multihomed mobile node 606 (i.e., there is a direct interface between SAE anchor 402 and UPE 405). In this case similar measures for transmitting or forwarding the data packets destined to multihomed mobile node 406 as described above may be foreseen. In this case however, if using link layer transport between SAE anchor 402/home agent and UPE 405, the link layer address or network layer address of the UPE 405 may be registered as a care-of address for the multihomed mobile node 406. Alternatively, if the multihomed mobile node's home address is registered in a care-of address, the routing table/neighbor cache in the SAE anchor 402/home agent indicates the UPE 405 as the next hop towards the multihomed mobile node 406.

FIG. 9 shows an exemplary routing table maintained by an SAE anchor/home agent according to an exemplary embodiment of the invention. In this example, a mobile node has three connections, two connections to a foreign network (first two rows) and one connection to the home network (3rd row). Moreover, there is a default routing entry * in the last row of the routing table.

The home agent sets up tunnels for the packets destined to CoA#1 and CoA#2. For this, virtual tunnel interfaces tun0 and tun1 may be established and the IP routing module forwards packets to CoA#1 or CoA#2 to the virtual interface tun0 or tun1, respectively. The virtual interface encapsulates the packets in IP with the IP address of the home agent as source address and the care-of address as destination address. In the next step the IP-in-IP encapsulated packets are again forwarded to the IP routing module. The next hop for IP packets to the care-of addresses are forwarded to the default gateway indicated by the entry * in the last row.

Furthermore, in this example, the home agent and a proxy node acting on behalf of the mobile node are on the same link. Packets for the MN destined to HoA#1 in the home network are not tunnelled, they will be forwarded to the link layer of the real interface. The neighbor cache entry of the link layer interface has an entry for the HoA#1 with the link layer address for the proxy node.

If using NetLMM, the LMA (irrespectively of its actual physical location) may send the binding update for registering a home network local care-of address for the multihomed mobile node 406. In this case the SAE anchor 402/home agent should register the address of the LMA as a care-of address for the multihomed mobile node 406 in the home network so that data packets (if provided through the home network) are forwarded to the LMA. Alternatively, if the home address of the multihomed mobile node 406 is registered as a care-of address for the multihomed mobile node 406 in the home network, the routing table/neighbor cache in the SAE anchor 402/home agent should be configured to indicate the LMA as the next hop on the distribution path towards the multihomed mobile node 406. As a result the distribution path may look like SAE anchor 402 (home agent)→LMA→MAG→eNode B→multihomed mobile node 606.

As becomes apparent from the explanations above, in some embodiments of the invention appropriate measures for configuring the user plane data traffic to/from the multihomed mobile node 406 may be foreseen in the home network. In general, irrespective of which local address is registered as a care-of address for the multihomed mobile node by means of a binding update sent to the home agent, the neighbor cache of the SAE anchor 402/home agent or its routing may be configured to indicate the link layer address, network layer address of the next hop or appropriate tunnel endpoint towards the multihomed mobile node.

For this purpose in one embodiment of the invention the network node/functional entity that is sending the binding update is either including appropriate update information for updating routing/neighbor cache entries to the binding update or uses separate signaling to configure the updating routing/neighbor cache entries in SAE anchor 402/the home agent and optionally further intermediate network nodes in the distribution path to the multihomed mobile node. Another alternative embodiment of the invention foresees that that the routing/neighbor cache entries of the network nodes are configured in response to the multihomed mobile node's attachment to the access network of the home network. For example in an architecture as shown in FIG. 4, the MME 404 may be requested by the multihomed mobile node to act as a proxy for the multihomed mobile node 406 in the home network. Accordingly, MME 404 may for example send a binding update to the home agent registering an address (being either the home address of multihomed mobile node 406 or the address of 3GPP anchor 402, UPE 405 or an LMA) as a care-of address of the multihomed mobile node 406 in the home network or may request one of the other network nodes/functional entities in the 3GPP packet core network 400 to do so. Depending on which address has been registered and whether a link layer or network layer address is registered as a care-of address, MME 404 may further update or establish the data distribution path through the home network by for example configuring the routing/neighbor cache entries at SAE anchor 402/home agent and optionally the routing/neighbor cache entries in 3GPP anchor 403 and/or UPE 405.

Another embodiment of the invention relates to a system where NetLMM is used in the home network. In this example the LMA function, the home agent function as well as the SAE function are located in a single network node, referred to as the SAE anchor in this example. Hence, in this case several functional entities are collocated in a single network element. Also in this exemplary embodiment similar mechanisms as described above may be used, since the different functional entities may be provided with virtual interfaces and identifiers so that data are relayed from one entity to another in the network element. Furthermore, the individual entities may directly alter (e.g., add, change, delete, update, etc.) settings and/or entries in the neighbor cache, binding cache and/or routing table within the SAE anchor. Hence, instead of one functional entity triggering the modifications to be performed by a respective other functional entity by means of internal signaling, the functional entities may directly modify the settings and/or entries in the neighbor cache, binding cache and/or routing table within the SAE anchor as needed.

Data Transmission to the Multihomed Mobile Node

In several embodiments above, the multihomed mobile node is not only connected to the home network but also to at least one foreign network. Accordingly in these embodiments there may be several care-of addresses registered for the multihomed mobile node at the home agent. If the home agent needs—for example—to forward data packets of a service (Operator IP Services, e.g., IMS, PSS; etc.) that origins from other packet switched network(s) 421 such as PDN, Internet, etc., the home agent has multiple care-of addresses to choose for forwarding the data.

Another embodiment foresees that the home agent determines which care-of address or which subset of registered care-of addresses to use to forward the data packets. The decision may for example be based on filter policies. These filter policies may for example include at least one of user preferences, network operator preferences, source and destination IP addresses, transport protocol number, source and destination port numbers, flow label field in the IPv6 header, Security Parameter Index (SPI) in case of using IPv6 security (IPsec), destination prefix, type of the multihomed mobile node interface associated to a care-of address, link characteristics on the communication link associated to a care-of address.

Hence, if for example the home network is a 3GPP-based UMTS network the voice data of a video conferencing session may be provided to the multihomed mobile node through the UMTS network, while the video data of the video conferencing session may be routed by the home agent through a foreign network to which the multihomed mobile node is connected and that is capable of providing a broadband services, e.g., a WLAN or WiMAX network. Accordingly, the home agent may use the registrations of multiple bindings to provide services like load sharing or load balancing. Further, this may also enable the support of preference settings that could allow a user, the application or a service provider to choose the preferred transmission technology or access network based on cost, efficiency, policies, bandwidth requirement, delay, etc.

Software and Hardware Implementation

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A home agent for enabling a user equipment having a plurality of interfaces to simultaneously use a home link and a foreign link, wherein the same home address of the user equipment is used for packets transferred through the plurality of interfaces, the home agent of the user equipment comprising:
a communication unit configured to receive a binding update message from the user equipment, when the user equipment has connected to both the home link and the foreign link,
wherein the binding update message contains the home address of the user equipment in the home link within a care-of address field of the binding update message, and
wherein the home agent is configured to register in response to receiving the binding update message a binding between the user equipment's home address and the care-of address indicated in the binding update message, the indicated care-of address being the home address of the user equipment, in a binding entry.

2. The home agent according to claim 1, wherein the binding update message registers a binding between the user equipment's home address and the care-of address indicated in the binding update message, the indicated care-of address being the home address of the user equipment, wherein the binding is registered together with another binding between the user equipment's home address and a care-of address configured in the foreign link.

* * * * *